United States Patent [19]

ten Berge

[11] Patent Number: 4,984,868
[45] Date of Patent: Jan. 15, 1991

[54] OPTICAL CONNECTOR AND METHOD OF FORMING AN OPTICAL SPLICE

[75] Inventor: Eduardus F. A. ten Berge, Drunen, Netherlands

[73] Assignee: AMP Incorporated, Harrisburg, Pa.

[21] Appl. No.: 364,940

[22] Filed: Jun. 12, 1989

[51] Int. Cl.$^5$ .............................................. G02B 6/38
[52] U.S. Cl. .............................................. 350/96.21
[58] Field of Search .............. 350/96.15, 96.20, 96.21, 350/96.22

[56] References Cited

U.S. PATENT DOCUMENTS

3,870,395  3/1975  Schicketanz ...................... 350/96.20
4,784,452  11/1988  Hodge et al. ..................... 350/96.16

FOREIGN PATENT DOCUMENTS

0160864  4/1985  European Pat. Off. .
0182577  11/1985  European Pat. Off. .
2272406  5/1975  France .
8707035  11/1987  PCT Int'l Appl. .

OTHER PUBLICATIONS

"Multimode Optical Fibers Steady State Mode Exciter", by Ikeda et al., Applied Optics, vol. 15, No. 9, Sep. 1976.
Article from Applied Optics, vol. 15, No. 9, 9/76, entitled "Multimode Optical Fibers: Steady State Mode Exciter".

Patent Abstract of Japan, vol. 1, No. 150, Japan Publication No. 52-89935.

*Primary Examiner*—Akm Ullah
*Attorney, Agent, or Firm*—Bruce J. Wolstoncroft

[57] ABSTRACT

An optical connector (2) includes a housing (4) having a through bore (10) therethrough terminating at an end face (8) of the housing (4). A short section of fibre (12) is inserted into an end of the connector housing (4) into the through bore (10) with a portion protruding beyond the end face (8). The protruding section is ground to effect a smooth finish. A gel is inserted within the through bore (10) adjacent and in abutment with the unfinished end (13) of the short fibre (12). A fibre (24) to be spliced can be inserted within the connector (2) into the through bore (10) and into optical abutment with the gel (20) such that the gel conforms to the two unfinished surfaces (13, 25) of the fibres (12, 24). The end face (8) of the connector (2) can be brought into optical abutment with a similar connector (2) to effect optical continuity between two similar fibres (12, 24). The fibre (13, 25) comprises a core material (14) surrounded by a thin cladding material (16) where the cladding material (16) has an index of refraction less than the index of the core material (14). Furthermore, the index of refraction of the inner surface (6) of the through bore (10) has an index of refraction equal to or less than the index of refraction of the cladding material (16).

12 Claims, 7 Drawing Sheets

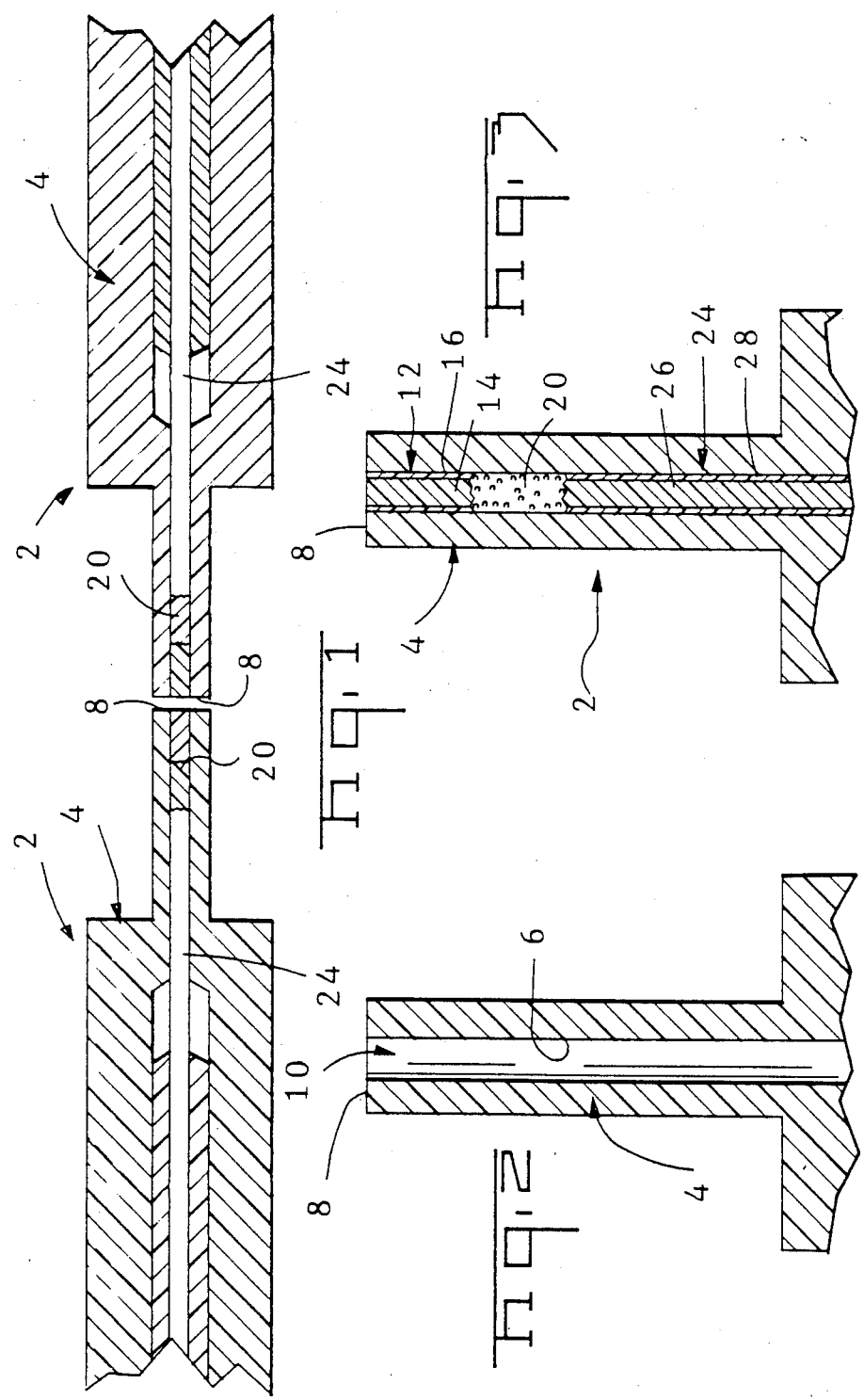

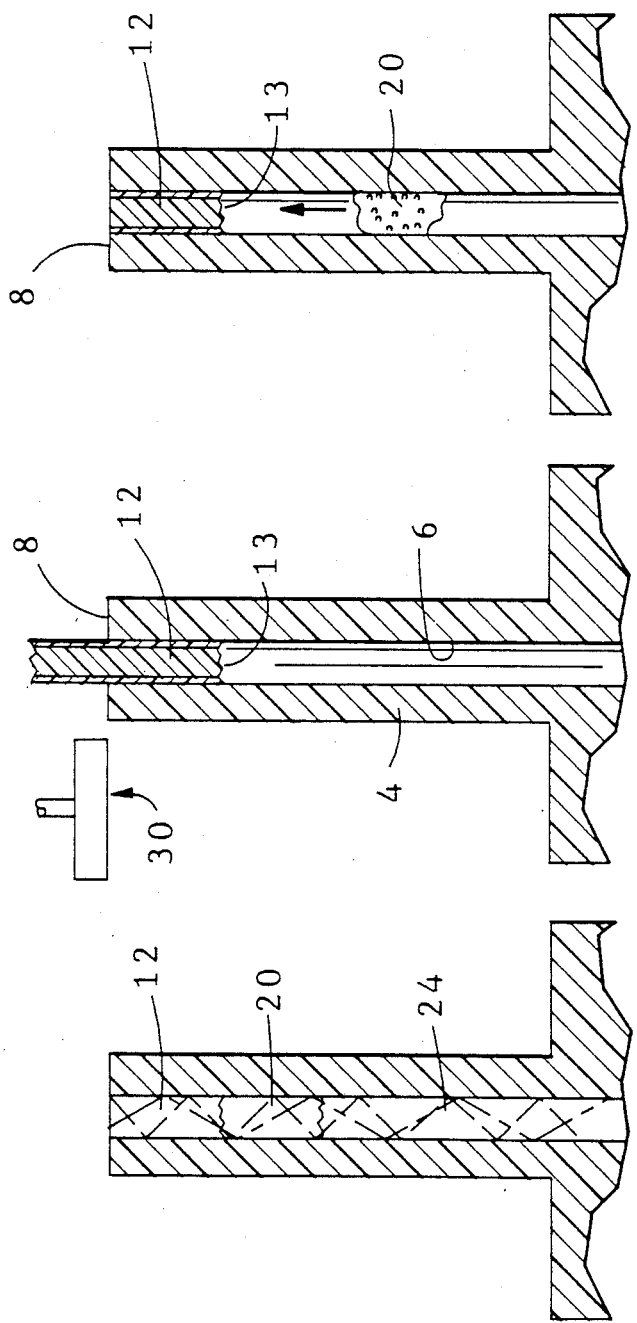

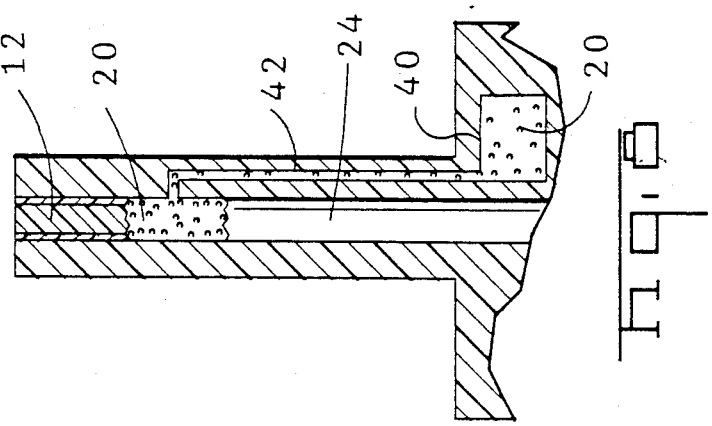
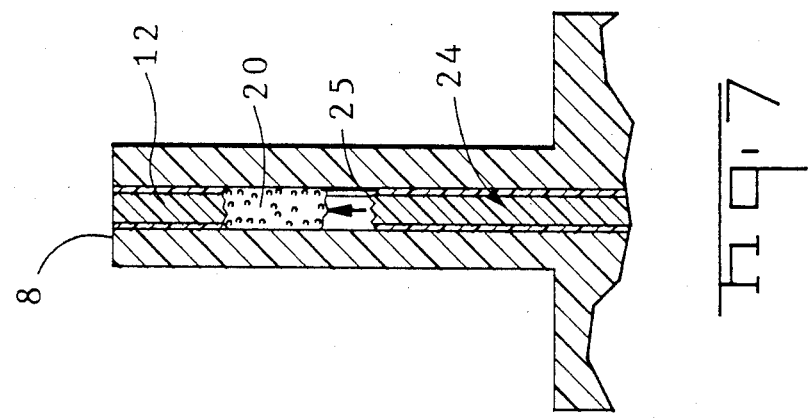
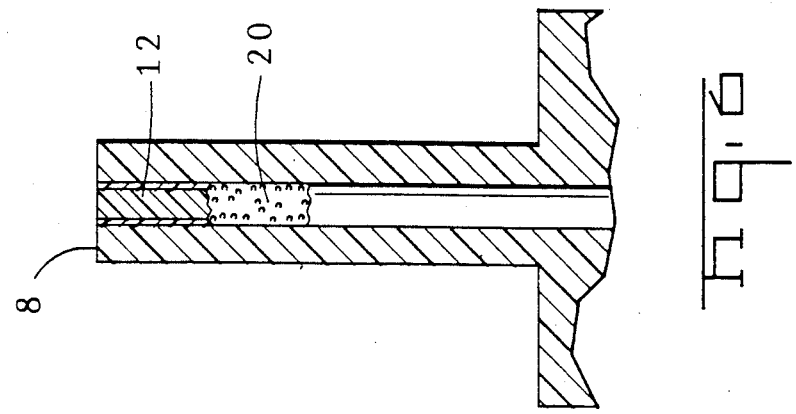

4,984,868

OPTICAL CONNECTOR AND METHOD OF FORMING AN OPTICAL SPLICE

FIELD OF THE INVENTION

The subject invention relates to a fibre optic connector and a method for splicing a fibre optic cable without the necessity of finishing the end of the fibre optic cable.

BACKGROUND OF THE INVENTION

Fibre optic cables are presently used in such areas as voice and data transmission in the computer and communications industries. While fibre optic cables are very efficient optically for such uses, leading to low signal losses through the cables, one of the present drawbacks to their use is the complexity of the field termination, that is splicing of two free ends of fibre optic cable. It should be understood that two fibres to be connected must be very precisely aligned in an abutting manner, without the presence of such discontinuities as gaps and the like between the end faces of the two fibres. A gap between two end faces causes reflection of the incident light due to the mismatch of the index between the two compounds. That is, air is present within the gaps and rough surfaces which can cause the scattering of the light and attenuation of the signal. Thus, this is the difficulty which presents itself in the field, the preparation of optical fibres for their abutting connection without the use of precisely controllable equipment. Presently, two methods of field termination of plastic core fibre optic cables are utilized.

The first method is to provide a plastic ferrule for insertion of a free end of a fibre optic cable therethrough. The fibre optic cable is glued to the inner periphery of the ferrule and the end of the cable has to be ground down to provide a smooth abutting surface for a similar free end of a mating fibre cable. It should be appreciated that the grinding process is not an easy one to control while in the field without a controlled environment, such as a manufacturing facility where tolerances can be kept to a minimum by the use of high quality machine tools.

A second method is similar to the first method except, rather than grinding the free end of the fibre optic cable, a hot plate is provided by the end user where the hot plate is abutted the jagged edge of the free end to melt the free end of the fibre optic cable to provide a flat, smooth surface. This method is particularly difficult to carry out as the melting of the plastic fibre must be precisely controlled, otherwise the plastic fibre could be burnt, or damaged by a poorly aligned hot plate. Each of these methods is difficult to carry out in the field in that the surfaces of the fibre optic cables must be finished in a smooth manner and in a square manner relative to the length of the cable for abutment against a mating cable. As mentioned above, it is necessary for two abutting fibre optic cables to be as flush as possible to prevent an air gap between the two cables thereby presenting a difference in index of refraction between the two

SUMMARY OF THE INVENTION

It is therefore an object of the invention to provide a connection system where two unfinished ends of fibre optic cables can be terminated.

It is a further object of the invention to provide an optical connector where a fibre optic cable with an unfinished end can be terminated within the connector, where the end of the fibre need not be ground or otherwise polished.

It is a further object of the invention to provide an optical connector for use with unfinished free ends of fibre optic cables where the signal is separated into individual other signals.

The above-mentioned objects were accomplished by providing a fibre optic connector where the connector comprises an optically isolating housing having a through bore terminating to an end face. At least two optical fibres are disposed within the through bore with free ends proximate to one another, at least one of the fibres having an unfinished free end. The fibres also have an inner core material and an outer cladding material. A gel is positioned between the two free ends of the fibre where the gel has an index of refraction substantially equal to that of the inner core. In the preferred embodiment of the invention, the inner wall of the bore has an index of refraction equal to or less than the index of the fibre cladding.

In another aspect of the invention, the fibre optic connector includes an insulating housing having a through bore terminating to an end face. An optical fibre is situated within the through bore housing and has a finished and ground surface at the free end which is adjacent to the end face of the housing. The opposite end of the optical fibre has an unfinished surface which is within the interior of the through bore. A gel is disposed within the through bore of the housing and is proximate to the unfinished free end of the fibre.

A method of producing the above-mentioned optical connectors comprises the steps of providing a housing of insulating material with a through bore therebetween; inserting a free end of a first optical fibre into the through bore of the housing with the free end having an unfinished surface; inserting a gel into the through bore housing; and inserting a second fibre into the housing into the opposite end of the through bore, with the second free end having an unfinished surface, the free ends of the first and second fibres being in optical abutment with the gel thereby providing optical interconnection between the two unfinished free ends.

While gels have been used for some applications to ensure interconnection between finished surfaces, for example see International Patent Application GB-87/00574, these gels have not been used for the interconnection of unfinished end faces.

The preferred embodiment of the invention will now be described in view of the drawings in which:

BRIEF DESCRIPTION OF THE DRAWINGS

FIG. 2 is a cross-sectional view of an end of the connector housing prior to the insertion of the fibre optic cables.

FIG. 3 is a cross-sectional view similar to that of FIG. 2, showing two fibre optic cables terminated within the through bore of the housing.

FIG. 3A is a diagrammatical view show the reflection of the incident light within the connection.

FIGS. 4–7 show cross-sectional views similar to that of FIGS. 2 and 3, showing the sequence of manufacturing the connector.

FIG. 8 is an alternate embodiment of the invention shown in FIGS. 1–7 above.

DETAILED DESCRIPTION OF THE INVENTION

Figure 1A:
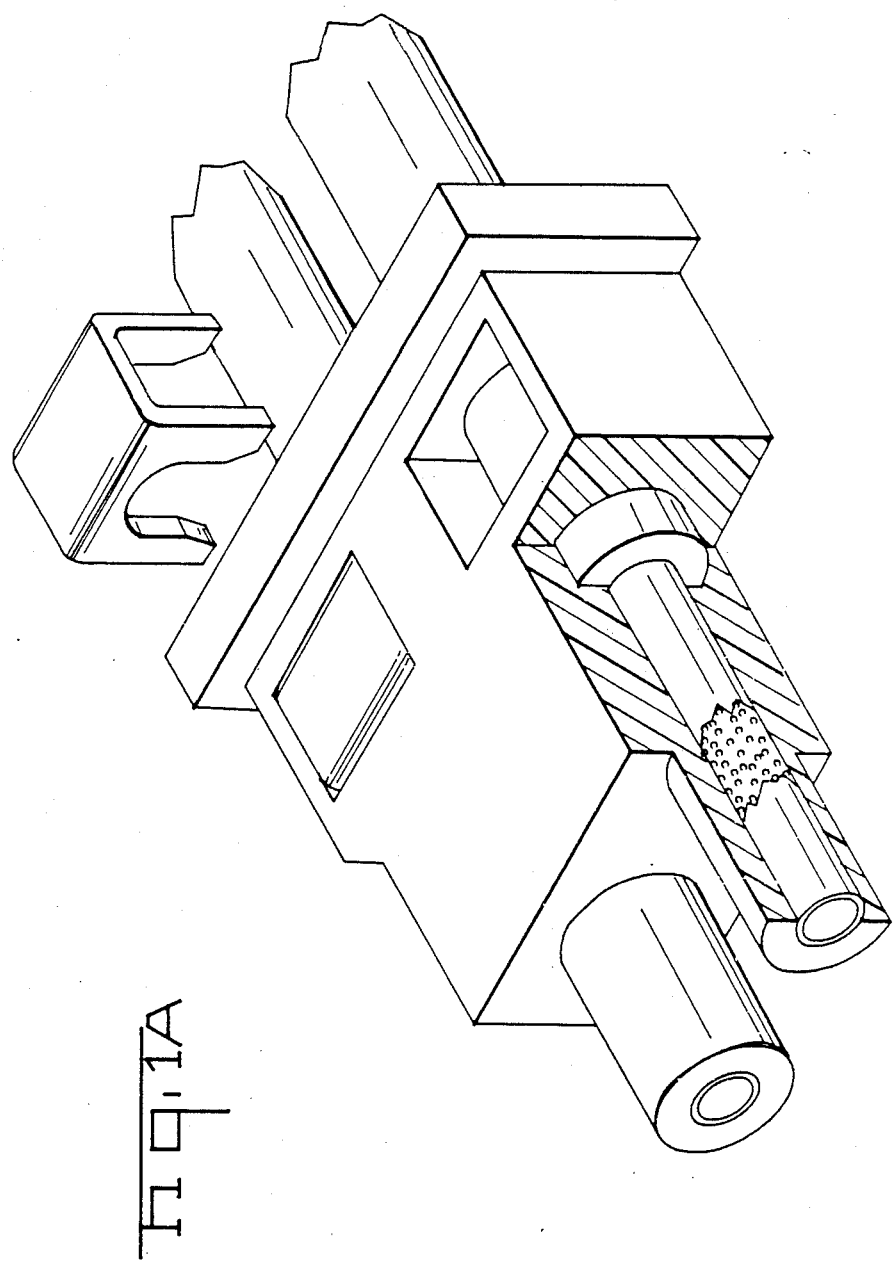
FIG. 1 is a cross-sectional view of two of the optical connectors proximate to one another prior to abutment of their end faces.

With reference first to FIGS. 1 and 3, the subject invention relates to a fibre optic connector for mating abutment with a similar connector where end faces, such as 8, are in optical abutment against one another to provide for optical continuity of the signal to be transmitted. It should be understood that the two connectors shown in FIG. 1 are shown in diagrammatic view without means for fixedly retaining the two connectors in place, but it should be understood that such conventional means as a rotatable retaining nut on one connector body which is matable with a threaded outer diameter on the mating connector body can be used for such retention means.

With reference to FIG. 2, the optical connector housing 4 is constructed of an optically isolating material, that is, non-transparent to light, and includes a through bore 10 which includes an inner diameter, such as 6, which terminates at the end or front face 8 of the connector housing.

With reference now to FIG. 3, the connector 2 further comprises a first short fibre 12 which includes a plastic core 14 surrounded by a thin cladding material, such as 16. In the preferred embodiment of the invention, the center plastic core 14 is approximately 1000 mils in thickness, whereas the cladding which surrounds the plastic core is approximately 15–20 mils in thickness. Furthermore, in the preferred embodiment of the invention, the index of refraction of the center core portion is approximately 1.49 whereas the index of refraction of the cladding material is 1.42.

With reference still to FIG. 3, a gel material, such as 20, is included within the optical connector 2 which has an index of refraction substantially equal to that of the core 14, that is the index of refraction of the gel material is substantially equal to 1.49. Also, the index of refraction of the housing material should be equal to, or less than, that of the cladding, which in this case is approximately equal to 1.42. A fluoride plastic, PTFE, would be suitable for these purposes.

Also shown in FIG. 3 is a further fibre optic cable 24 having inner cores 26 and outer cladding 28 substantially identical to the core and outer cladding of the first short fibre in the connector. It should be understood that the second fibre 24 is the fibre to be terminated in the field.

With reference to FIGS. 4–7, the method of making the fibre optic connector and making the fibre optic connection will be described in greater detail. As shown in FIG. 4, a short length of fibre 12 is provided in the inner bore 6 of the connector housing 4 and affixed to the inner bore. It should be noted that a portion of the unfinished end of the fibre cable is projecting beyond the end face 8 of the housing. With the short section of fibre installed within the through bore of the housing, the unfinished free end of the short fibre 12 can be subjected to such finishing and polishing means as a rotary surface grinder, such as 30, which is brought into finishing abutment to polish the end of the optical fibre.

After the end of the fibre is finished, a section of gel is disposed within the through bore 6 of the connector housing, as shown in FIG. 5, and is moved into optical abutment with the opposite end 13 of the short fibre 12. It should be noted that the opposite end 13 remains unfinished, that is, the opposite end 13 has not been ground or polished as the forward end. When the gel 20 is in optical abutment with the short fibre 12, the gel which is adjacent or which abuts the end face 13 of the short fibre 12 conforms to the contour of the unfinished face 13, as shown in FIG. 6. It would be the connector of FIG. 6 which would be shipped to a customer for field installation of a second fibre, such as 24.

With the connector, as assembled in FIG. 6 in hand, the interconnection of the second fibre 24 includes only breaking an end of the fibre 24 and inserting the fibre 24 into the through bore 6 of the housing 4 and further into optical abutment with the gel 20. Full insertion of the second fibre 24 into the gel 20 causes the gel, which is adjacent to the front face 25 of the second fibre, to similarly conform to the front face 25 of the second fibre 24, as shown in FIG. 7. With the connector 2 assembled as described above, and with the index match between the fibre core 14 and the gel 20, the light passes through the gel without refraction, as shown in FIG. 3A; in other words, the reflection of the incident light is identical to that through a continuous length of fibre.

The advantages of the above-mentioned fibre optic connector should be appreciated to those skilled in the art. First, the fibre optic connector is easily manufactured. The plastic housings 4 could be mass fed through an assembly procedure with the end faces 8 aligned in a common plane, with a reel of the fibre optic cable positioned proximate to the housings. A short length of fibre could be sheared from the roll of fibre optic cable and stitched into the through bore of the connector housing with only a portion of the end of the short fibre, such as 12, extending from the front face 8 of the housing. The housings with the short fibre could then be automatically subjected to the surface grinder 30 and, subsequently, the gel could be dispensed into the opposite end of the through bore 10 of the housing. It should be appreciated, however, that the gel 20 could be dispensed within the through bore 10 of the housing prior to the insertion of the short length of fibre 12. It should be appreciated that the free end of the fibre optic cable 12, which projects beyond the end face 8 of the housing, can be polished within very close tolerances within a factory atmosphere, as highly accurate machine tools and fixtures can be in place for such manufacturing tolerances.

It should be further appreciated that the installation of the second fibre 24 is further simplified by the connector of the subject invention in that the forward end 25 need not be polished in the field but merely can be broken in the field and inserted into the through bore of the connector and into the gel 20.

With reference now to FIG. 8, the inventive connector of FIGS. 1–7 can be modified to include an extra reservoir of gel, in the event the connectors are to be used in extreme conditions; such as large variances in temperature which could effect the volume of the gel, or in physically hazardous conditions where the fibres may be subject to tension. In this event a reservoir 40 can be included which contains an extra supply of gel 20 in communication with the gel intermediate the fibres 12 and 24, by means of a slit or aperture 42; either a volumetric change in the gel between the two fibres 12 and 24, or a physical movement the fibres 12 and 24 would be taken up with the extra gel found in the reservoir, or would be added to the reservoir.

Figure 9:
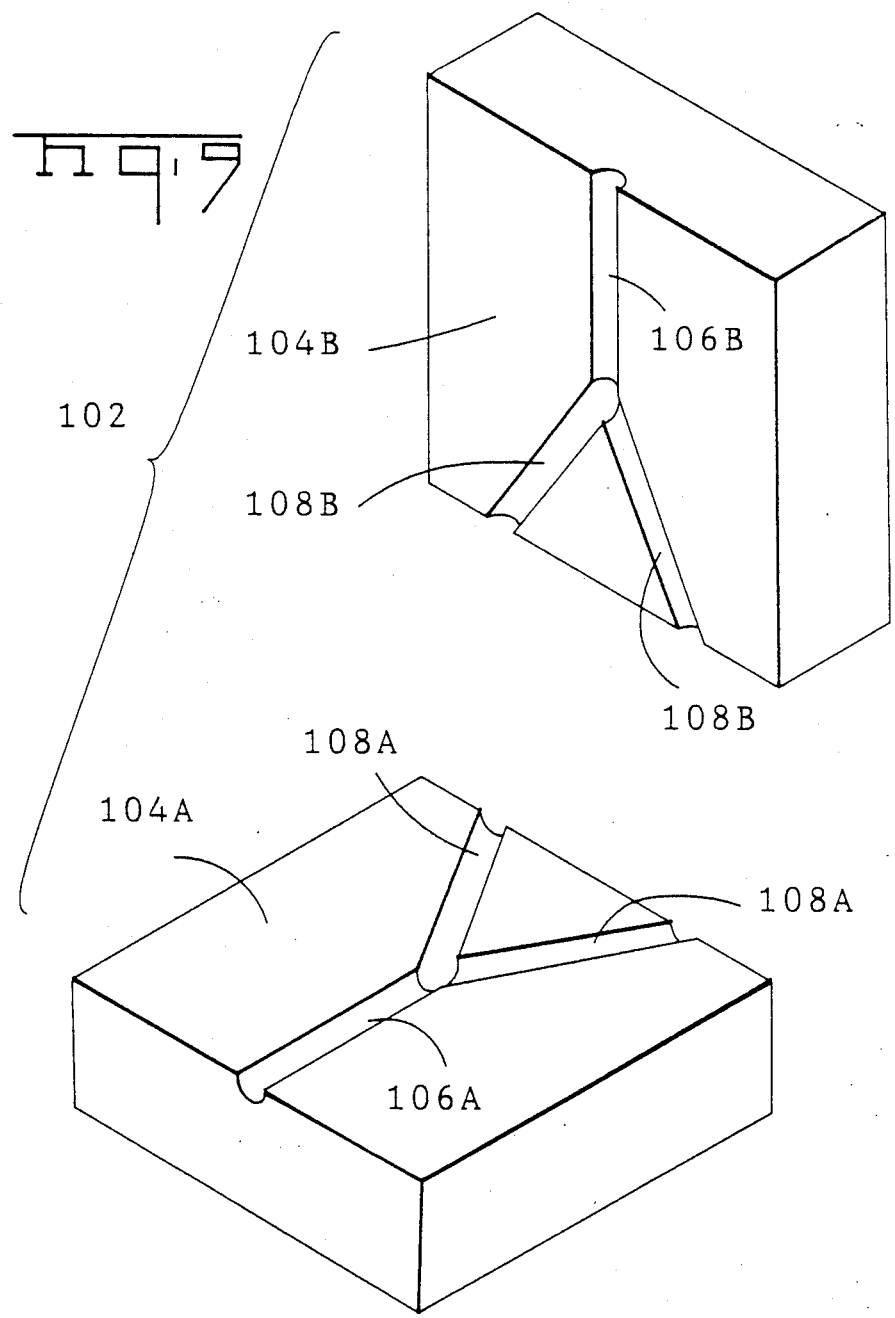
FIG. 9 is an isometric view of housing halves of a similar connector system constituting a splitter.
Figure 10:
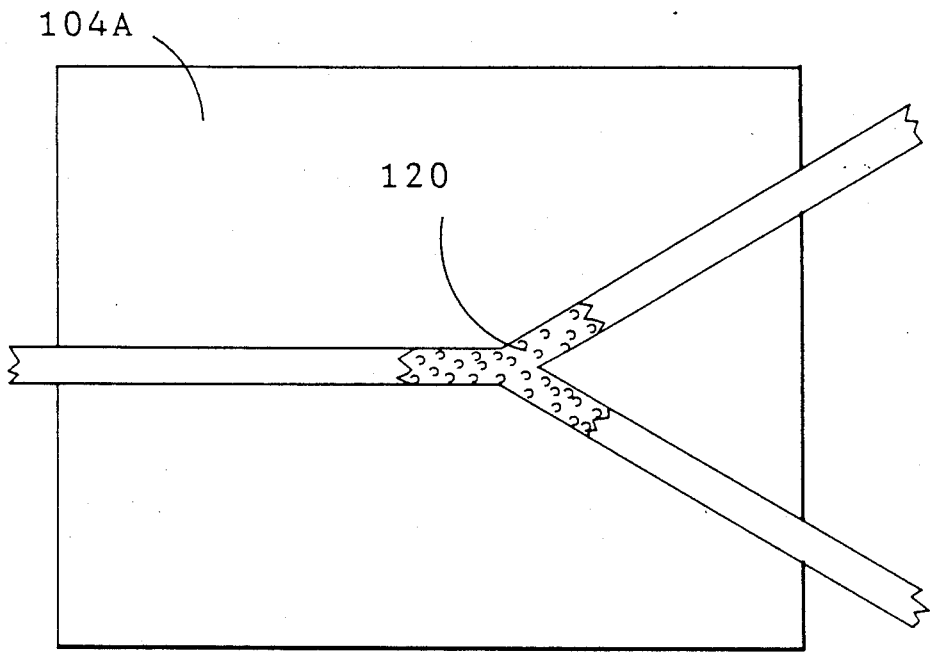
FIG. 10 is a top plan view of one of the housing halves showing the fibre optic cables in position.
Figure 11:
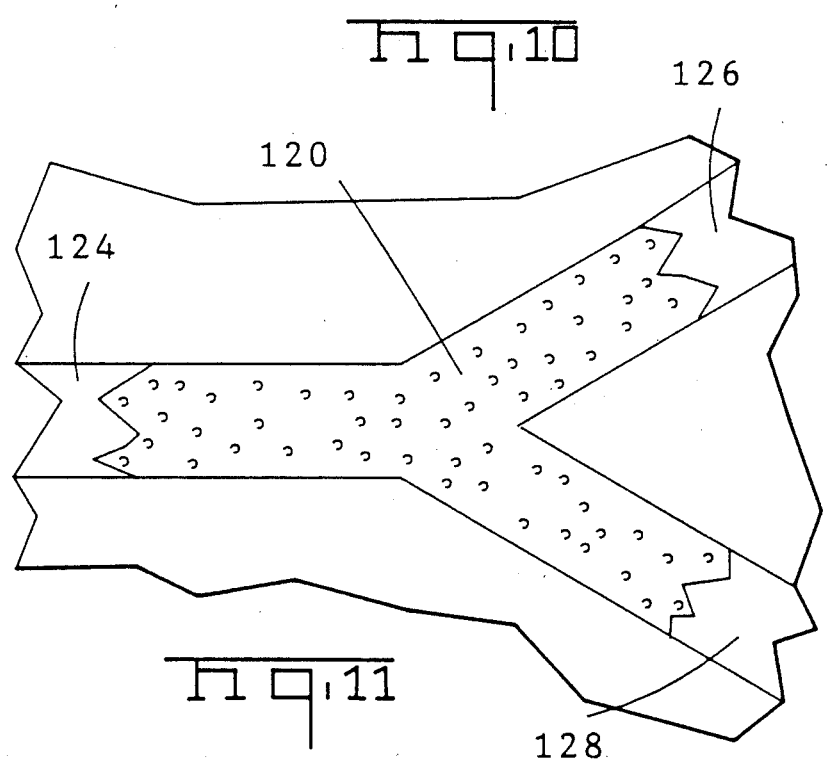
FIG. 11 is an enlarged view of the splice area.
Figure 11A:
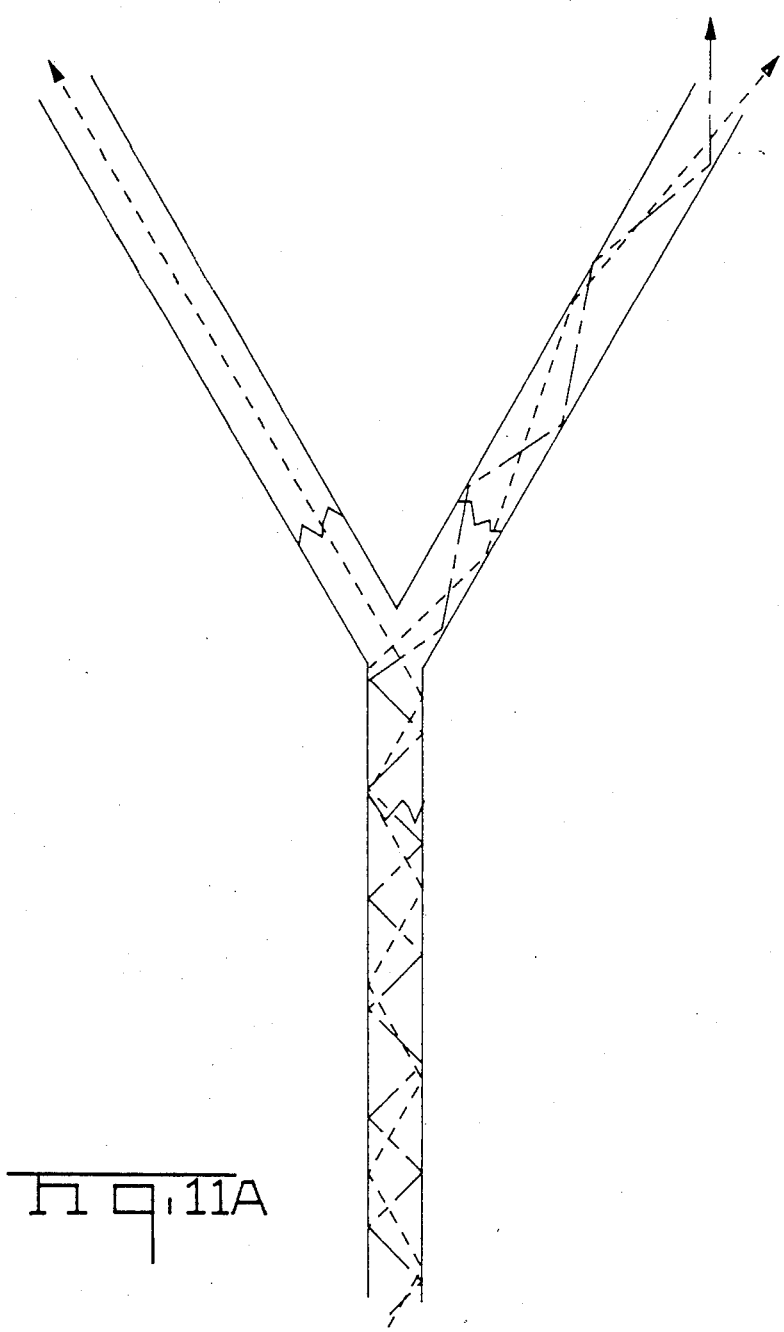
FIG. 11A is a diagrammatical view showing the reflection of the incident light within the splitter connection.

With reference now to FIG. 9, a second similar embodiment is shown where the inventive method is used as a splitting mechanism for the optical signals. Two housing halves are provided, such as 104a and 104b, with overlapping sections 106a and 108a which, when in position, define a through bore having a Y configuration. The inventive method would include the inclusion of the gel material such that the gel is situated within at least a portion of the Y configuration, as shown in FIG. 10, and the optical connector would be shipped to the end user in this configuration. To terminate the optical cables into a spliced configuration, the cables would similarly be brought into optical abutment with the gel, as shown in FIG. 11, such that the gel conforms to the end faces of the optical cables. In such a manner, the signal of fibre 124 could be split into two signals, within fibres 126 and 128, with the reflection of the incident light being shown diagrammatically in FIG. 11A. The embodiment shown in FIGS. 9–11 would have similar physical characteristics as those indicated above for the connector 2.

I claim:

1. A fibre optic connector for optical connection to a similar connector, comprising:
    a housing of an optically isolating material having a through bore terminating to an end face;
    an optical fibre situated within the through bore of the housing, the fibre having a finished and ground surface at the free end which is adjacent to the end face of the housing, and an unfinished surface at the opposite free end which is within the interior of the through bore; and
    a gel disposed within the through bore of the housing and proximate to the unfinished free end of the fibre.

2. The connector of claim 2 wherein the fibre comprises a core with a thin outer cladding, and the index of refraction of the cladding material is less than that of the inner core.

3. The connector of claim 1 or 2 wherein the gel has an index of refraction substantially equal to the index of refraction of the fibre core.

4. The connector of any of claim 1–3 wherein the index of refraction of the housing material is less than that of the cladding.

5. A fibre optic connector for optical connection to a similar connector, comprising:
    a housing of an optically isolating material having a through bore terminating to an end face;
    an optical fibre situated within the through bore of the housing, the fibre having a finished and ground surface at the free end which is adjacent to the end face of the housing, and an unfinished surface at the opposite free end which is within the interior of the through bore; and
    a gel disposed within the through bore of the housing and proximate to the unfinished free end of the fibre
    a thin aperture communicating between a reservoir in the housing and with the through bore, at an axial location where the gel is situated.

6. A fibre optic connector for optical connection to a similar connector, comprising:
    a housing of an optically isolating material having a through bore terminating to an end face;
    an optical fibre situated within the through bore of the housing, the fibre having a finished and ground surface at the free end which is adjacent to the end face of the housing, and an unfinished surface at the opposite free end which is within the interior of the through bore; and
    a gel disposed within the through bore of the housing and proximate to the unfinished free end of the fibre
    the housing has an aperture in communication with the inner bore at a position where the gel is located, and the aperture is in further communication with a reservoir of gel to compensate for volumetric variances between the two fibre ends.

7. The connection of claim 6 wherein more than two fibres are included, one of the said fibres being split into a plurality of optical signals.

8. The connection of claim 6 wherein the housing has an end face, and one of the said fibres is ground to be coplanar with the end face for optical abutment to a like fibre.

9. An optical connection between at least two optical fibres comprising:
    a housing means made of an optically isolating material having a through passageway therethrough;
    at least two optical fibres disposed within the through passageway, with free ends proximate to one another, at least one of the fibres having an unfinished free end, the fibres having an inner core material and an outer cladding material where the index of refraction of the cladding material is less than the index of refraction of the core material, and the index of refraction of the housing material is substantially equal to or less than the index of refraction of the cladding material; and
    a gel positioned between the two free ends of the fibres, the gel having an index of refraction substantially equal to that of the inner core.

10. A method of making an optical connection comprising the steps of:
    providing a housing of an optically isolating material with a through bore therethrough;
    inserting a free end of a first optical fibre into the through bore of the housing, with the free end having an unfinished surface;
    inserting a gel into the through bore of the housing;
    inserting a second fibre into the housing into the opposite end of the through bore, with the second free end having an unfinished surface, the free ends of the first and second fibres being in optical abutment with the gel, thereby providing optical interconnection between the two unfinished free ends.

11. A method of using the connector of claim 10 or 1 comprises the further step of:
    inserting an unfinished free end of a second fibre into the opposite end of the housing through bore into optical abutment with the gel, whereby to effect optical interconnection between the two said fibre free ends.

12. A method of making an optical connector comprises the steps of:
    providing a housing of an optically isolating material with a through bore therethrough, the through bore terminating at an end face thereof;
    inserting a short length of optical fibre into the through bore of the housing until a portion of one free end of the fibre projects beyond the end face of the housing, each free end of the fibre having unfinished surfaces;

grinding the end face of the fibre free end which projects beyond the housing end face;

inserting a gel into the through bore of the housing, such that the gel and the free end of the short fibre are in optical abutment;

inserting a further fibre into the housing, into the opposite end of the through bore, the free end of the further fibre and the free end of the short fibre in optical abutment with the gel, thereby providing optical interconnection between the two unfinished free ends.

* * * * *